INVENTOR.
Delbert Edwards
BY
Atty.

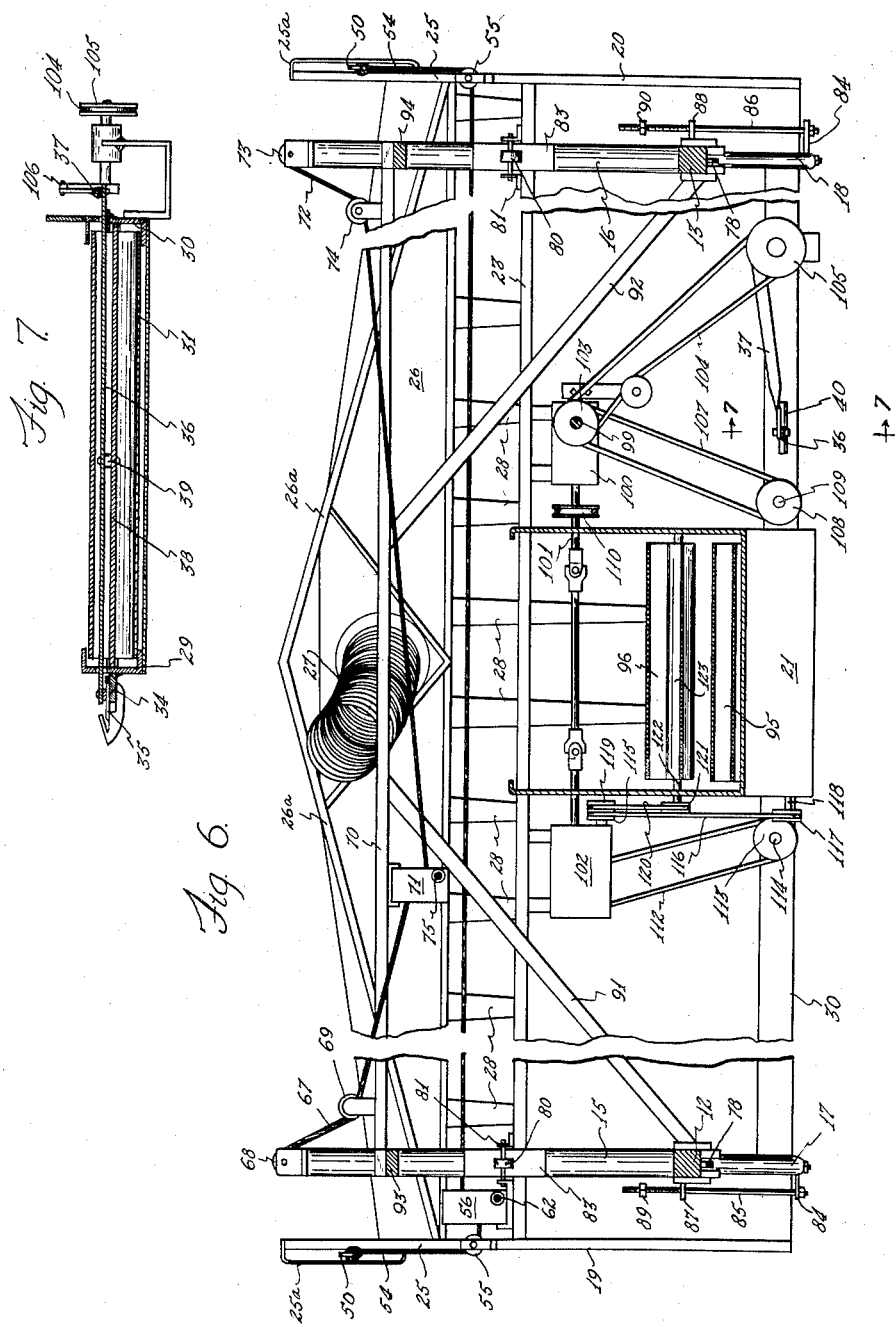

Feb. 5, 1957     D. EDWARDS     2,780,046
ADJUSTABLE HEADER FOR SEED HARVESTER WITH
PNEUMATIC CONVEYING MEANS
Filed Oct. 16, 1953     5 Sheets-Sheet 5

INVENTOR.
Delbert Edwards
BY
Atty.

United States Patent Office 2,780,046
Patented Feb. 5, 1957

2,780,046
ADJUSTABLE HEADER FOR SEED HARVESTER WITH PNEUMATIC CONVEYING MEANS

Delbert Edwards, Condon, Oreg.

Application October 16, 1953, Serial No. 386,487

12 Claims. (Cl. 56—158)

My invention relates to headers for cutting and collecting the grain heads of such crops as wheat, oats, barley, etc. It is the principal purpose of my invention to provide a novel means for directing the grain stalks and heads toward the advancing cutter bar and sickle of a header in such a way as to minimize the grain loss, the directing means utilizing the combination of a multiplicity of divider blades spaced apart along the length of the cutter bar and extending forwardly of the cutter bar and above it, together with means for creating a flow of air between the blades which is sufficient to bend the grain stalks toward the advancing cutter bar and carry the cut stalks onto the conveyor mechanism immediately behind the cutter bar.

The standard means for directing grain crops against the cutter bar and pushing the cut stalks and heads rearwardly onto the conveying mechanism back of the cutter bar has long been a real or paddle device which strikes the grain heads and stalks and forces them rearwardly as the header advances. It is a well known fact that where the heads of grains are fully ripe, this results in a substantial amount of shattering. The grain seeds fall out and a substantial amount may be lost particularly when the grain stalks are short. It has been proposed heretofore to utilize an air blast as a means of forcing the grain stalks rearwardly but despite the fact that several of these proposed air blast devices are quite old, they have not solved the problem and they have not come into any substantial commercial use so far as I am aware.

More specifically it is the purpose of the present invention to provide a header which comprises in combination a cutting device embodying a sickle and a cutter bar with a conveyor behind the sickle and cutter bar to carry away the cut crop, together with a multiplicity of divider blades spaced above and forward of the cutting device and conveyor, the dividers having tubular portions provided with air outlets adapted to direct air jets through the outlets rearwardly, and thereby to create a rearward air draft between the dividers, the several dividers being carried by an air supply tube which is supported above the cutter bar and conveyor and supplied with air under pressure through a flexible conduit.

It is a purpose of my invention to provide in a header of the character described a novel mechanism for supporting the header unit so that it can yield upwardly to clear an obstruction without the application of a substantial force.

The nature and advantages of my invention will appear more fully from the following description and the accompanying drawings wherein a preferred form of the invention is shown. It should be understood however, that the drawings and description are illustrative only and are not intended to limit the invention except insofar as it is limited by the claims.

In the drawings:

Figure 6 is a sectional view taken substantially on the line 6—6 of Figure 3;

Figure 7 is an enlarged fragmentary sectional view through the header illustrating the sickle drive mechanism, taken substantially on the line 7—7 of Figure 6;

Figure 1:
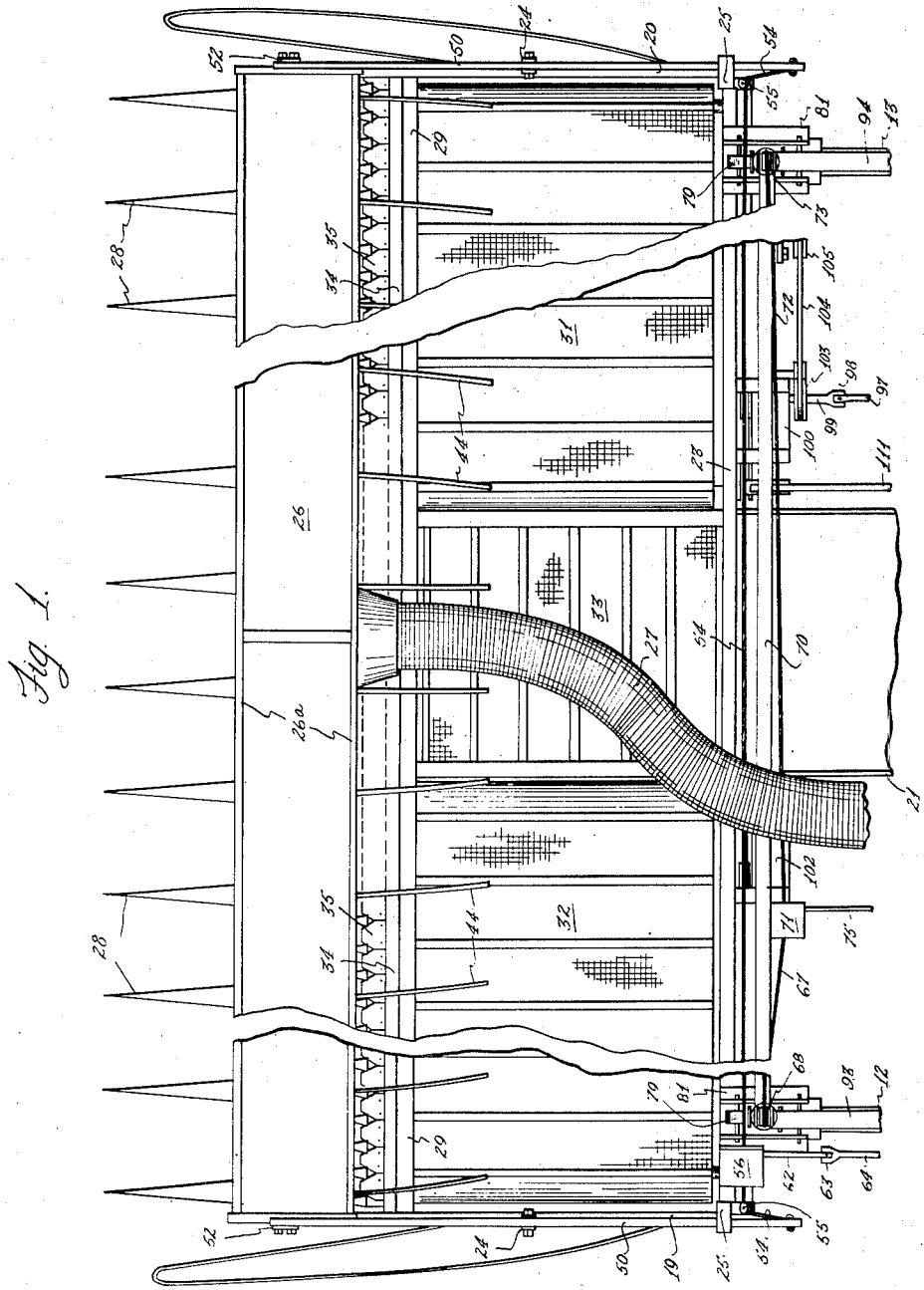
Figure 1 is a fragmentary plan view of a header embodying my invention.
Figure 2:
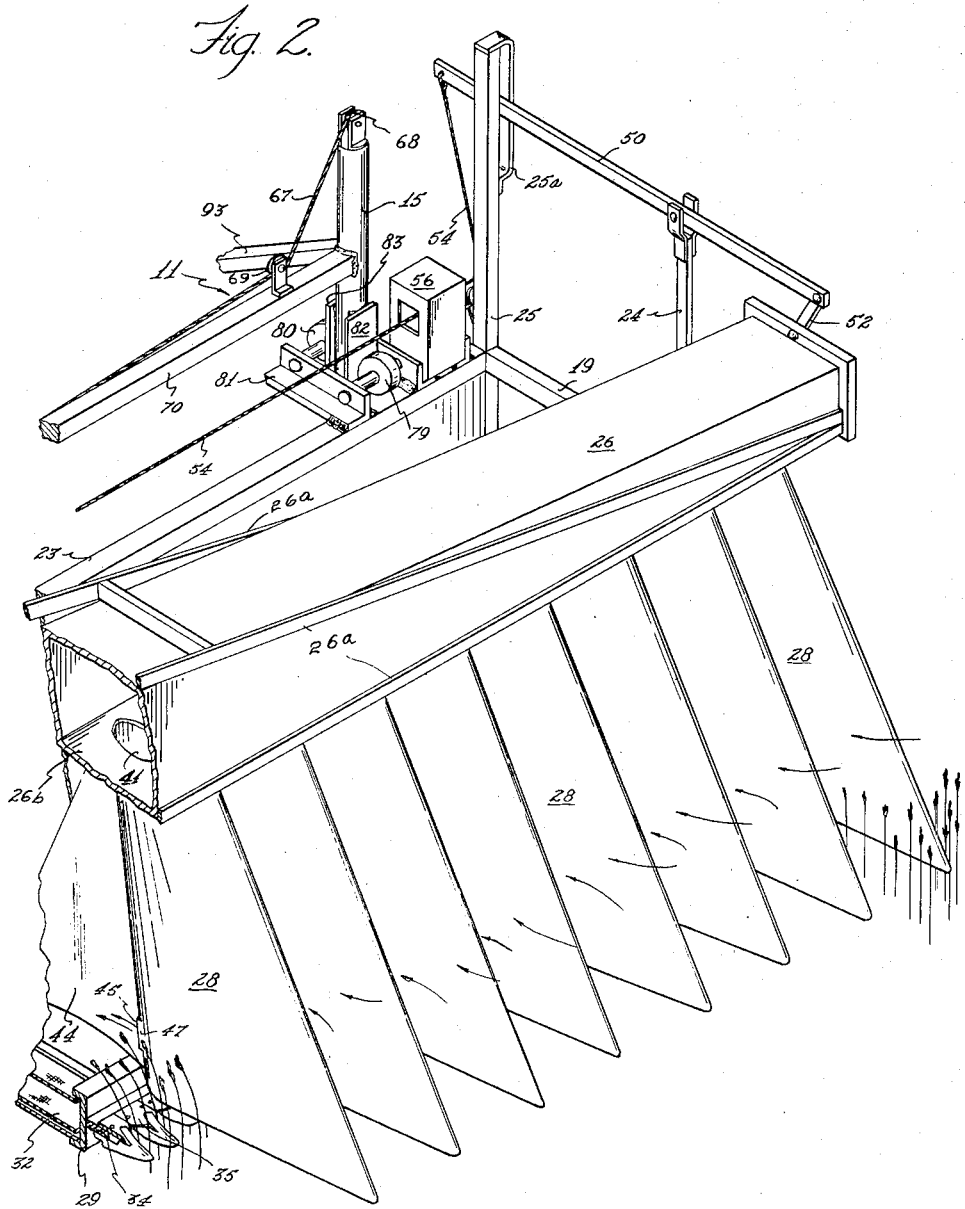
Figure 2 is an enlarged perspective view of a portion of the header illustrating the way in which the dividers function to direct the grain as it is cut, rearwardly over the cutter mechanism onto the conveyor behind the cutter mechanism.
Figure 3:
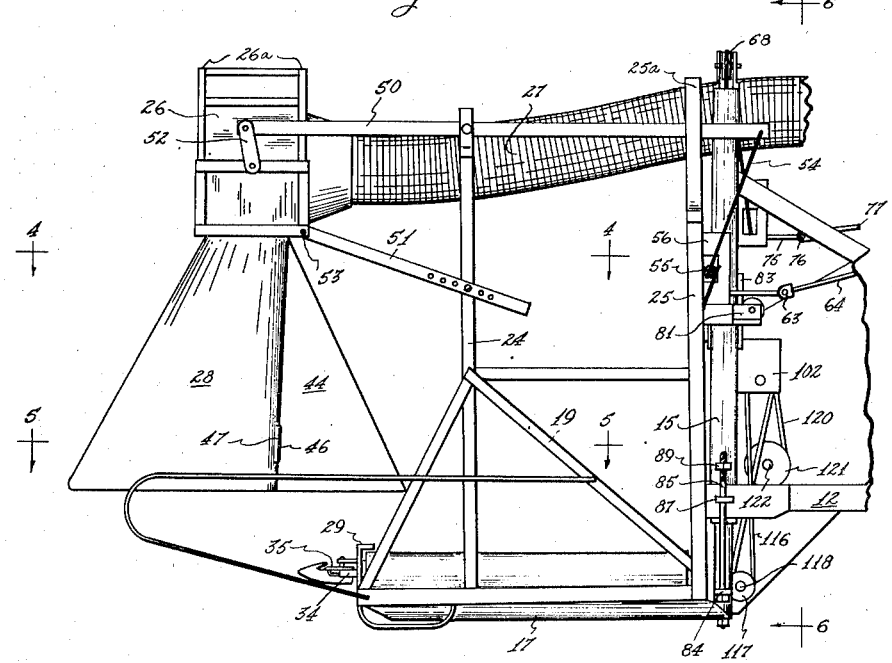
Figure 3 is an end view of the header.
Figure 4:
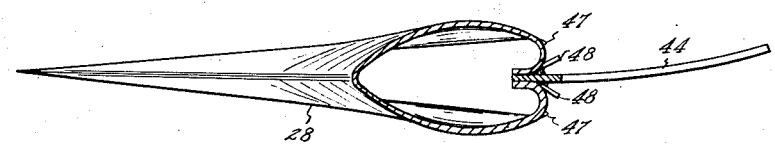
Figure 4 is a sectional view taken through a divider at the line 4—4 of Figure 3 on an enlarged scale to show the divider construction.
Figure 5:
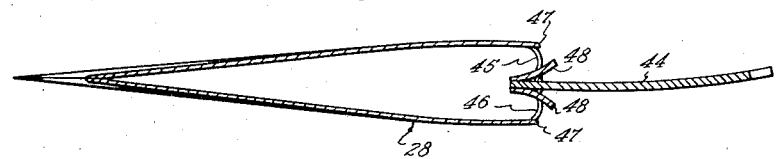
Figure 5 is an enlarged sectional view taken through a divider at the line 5—5 of Figure 3.

Referring now in detail to the drawings and in particular to Figures 1, 2 and 3, my improved header comprises a rear supporting framework identified generally by the numeral 11, which is mounted on two pusher bars 12 and 13 that are supported by wheels (not shown). The frame 11 is provided with two end posts 15 and 16 which carry the header proper by means of two L-shaped tubular members 17 and 18 that are suspended in the tubular members 15 and 16 in such a fashion that they may be moved up and down readily. The L-shaped members 17 and 18 carry end frames 19 and 20 which are connected to each other and to a central spout 21 by cross bars 23.

Each of the end frames 19 and 20 includes two uprights 24 and 25, one upright being spaced forwardly of the other and these uprights carry a divider support frame and a tubular casing 26 in such a fashion that the support frame may be moved up and down with respect to the header frame in a manner which will be described later. The support frame includes frame members 26a. The tubular casing 26 is supplied with air by a large flexible conduit 27 from a suitable air supply (not shown). A plurality of thin dividers 28 are suspended from the casing 26 and have tubular portions that extend forwardly and downwardly from the casing as illustrated best in Figures 2 and 3.

The end members 19 and 20 are connected together at their front and back ends by frame members 29 and 30 which also serve to mount conveyors 31, 32 and 33, a cutter bar 34 and a sickle 35. The sickle drive is by means of a rocker bar 36 which extends through the frame members 29 and 30 from the sickle to a pitman rod 37. A cross tie 38 between the frames 29 and 30 supports a pivot pin 39 for the bar 36. The rear frame member 30 has a bearing plate 40 thereon for the bar 36. The sickle 35 is pivoted to the front end of the bar 36. The driving mechanism for the pitman rod 37 will be described more fully hereinafter.

The dividers 28 extend a substantial distance in front of the sickle 35 and have their lower ends spaced above the sickle 35. The rear edges of the tubular portions of the dividers are slightly in front of the sickle. Each divider 28 has a relatively wide top inlet portion 41 which opens into the bottom wall 26b of the casing 26. The dividers 28 are gradually decreased in width and increased in length from the casing 26 to their lower ends, the forward edge of each divider being relatively sharp and extending forwardly from the casing 26 to the lower end of the divider. The lower end of the divider is closed. At its rear edge, the tubular portion of each divider joins a blade 44 that extends rearwardly from a vertical line downward from the rear wall of the casing 26. The blade 44 is tapered so as to have its greatest horizontal dimension at the bottom and it is preferably curved as illustrated, so as to direct the rearward most portions of the cut stalks toward the center of the header. The dividers 28 are evenly spaced apart throughout the length of the casing 26. Each divider has air outlets 45 and 46 formed at the rear edge of its tubular portion a short distance above the lower end. The outlets 45 and 46 are formed by punching out portions 47 and 48 of the walls of the dividers so that these portions form deflectors to direct air jets from the tubular portions rearwardly between the blades 44. The air jets act to draw air rearwardly between the tubular portions of the dividers.

As a specific example of relative dimensions, the tubular portion of a divider is about 27 inches high and about 24 inches long at its lower end. The blade 44 is about 12 inches long at its lower edge. The transverse dimension of the divider 28 at its lower end varies from a point at the forward tip to about 3 inches at its widest point. At the junction of the divider with the casing 26, the width across the divider is about 5 inches. This provides a stiff divider construction that can withstand the vibrations due to traveling over rough ground without distortion. The openings 45 and 46 are placed at the rear of the divider 28 so that they discharge jets of air rearwardly between the blades 44 to create an air flow in the right direction to bend the stalks between the dividers rearwardly. The action of the air stream upon the grain stalks is not violent but, with a relatively low pressure of two to three pounds per square inch within the dividers, the rearwardly directed jets of air create enough of an air stream between the dividers to bend the stalks rearwardly before they are cut by the sickle 35 and to make sure that the stalks cut will be laid back onto the conveyors behind the sickle 35.

This means of causing the grain stalks to be deflected rearwardly as they are cut, eliminates the principal cause of shattering of the grain from the heads as it is cut. The narrow forward edges of the dividers slice through the standing grain with a minimum of disturbance. When the stalks are between the dividers, the dividers act as a confining means for the air stream so that it will deflect the stalks rearwardly by the time they are cut by the sickle and any grain that is shattered out due to the jar of the sickle cutting the stalk, will be subjected to the rearward blast of the air which will tend to carry it onto the conveyor so that it will be saved. The air jets are low down so as to catch any short grain but they also deflect the tall grain equally well because they create a rearward draft between the dividers both above and below them. The total area of the outlets 45 and 46 is small when compared with the inlet area to each divider so that an ample supply of air can be maintained.

Figure 9:
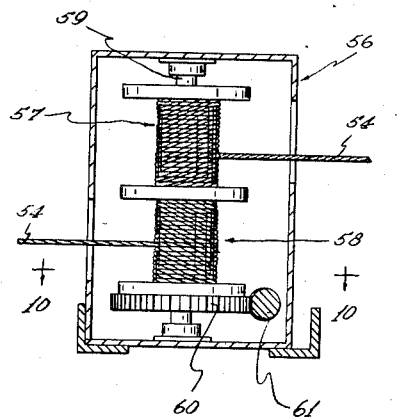
Figure 9 is an enlarged view, with parts broken away and shown in section, of the cable control box illustrating the drums by which the header and the divider units are raised and lowered.
Figure 10:
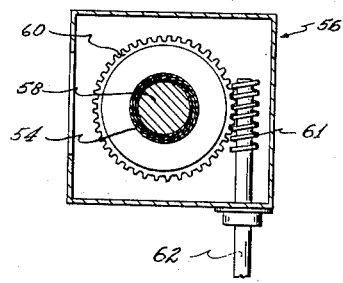
Figure 10 is a sectional view taken on the line 10—10 of Figure 9.

In order to adjust the dividers 28 up and down with respect to the cutting mechanism, I provide supports on the uprights 24 for the ends of the tubular casing 26. These supports comprise an upper lever arm 50 and a lower arm 51 on each upright 24. The lever arm 50 extends forwardly and has a link 52 that extends down to the top of the adjacent end of the casing 26 to suspend the casing. The lower arm 51 is pivoted by a pivot member 53 to the adjacent corner of the end of the casing 26. The lever arm 50 extends rearwardly from the upright 24 through a guide portion 25a of the rear upright 25. Cables 54 extend downwardly from the rear ends of the levers 50 under pulleys 55 that are mounted on the rear faces of the uprights 25 and then horizontally into a cable winding unit 56, the details of which are shown in Figures 9 and 10.

The cable winding unit 56 has two drum portions 57 and 58 therein; these drum portions being fixed on a common shaft 59 which is journalled in a housing of the unit 56. A worm gear 60 is fixed on the shaft 59 and meshes with a worm 61. The worm 61 is rotated by a shaft 62 which projects rearwardly and which is connected by a universal joint 63 to an operating rod 64 which can be manually rotated to turn the worm 61. The cables 54 are so secured on the drum portions 57 and 58 that rotation of the shaft 59 in one direction will wind both cables on the drum portions 57 and 58 so as to pull down on the rear ends of the levers and lift the dividers. By turning the shaft 59 in the opposite direction, the cables are unwound to allow the rear end of the lever 50 to rise and lower the dividers.

Figure 8:
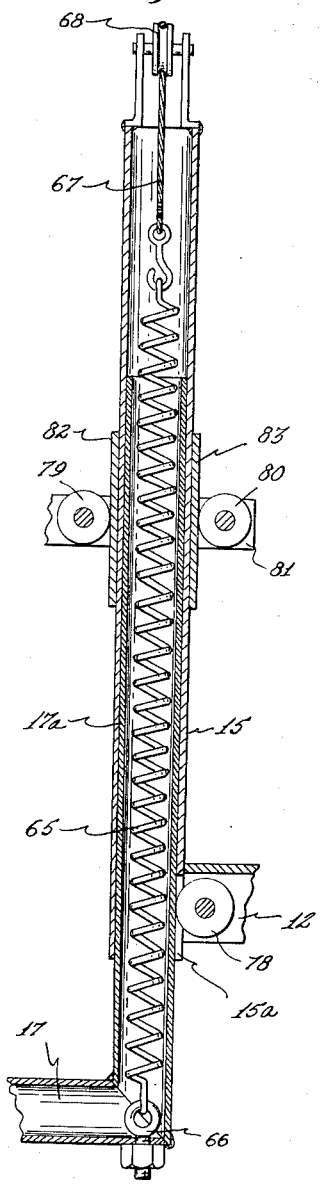
Figure 8 is an enlarged view, with parts broken away and shown in section, showing the details of mounting the header for vertical movement on its supporting frame.

The entire header unit is raised and lowered by moving the L-shaped members 17 and 18 up and down with respect to the tubular members 15 and 16. As illustrated best in Figure 8, the member 17 has its upright portion such as 17a slidable vertically in the tubular member 15. A spring 65 is secured in the member 17 at the bottom of the portion 17a by an eye bolt 66. This coil spring 65 is connected at its upper end to a cable 67 which is trained over a sheave 68 that is mounted on the top of the member 15. The cable 67 then passes downwardly under a sheave 69 that is mounted on a cross frame member 70 that connects the tubular members 15 and 16. The cable 67 enters a cable winding unit 71 which is constructed like the unit 56.

The L-shaped tubular member 18 is mounted in the member 16 in the same fashion as the L-shaped member 17 is mounted in the tubular member 15. A cable 72 is connected to the spring (not shown) that supports the tubular member 18 in the member 16. The cable 72 passes over a sheave 73 that is mounted on the top of the tubular member 16. The cable 72 then passes down beneath a sheave 74 that is mounted on the cross bar 70 and extends across the back of the header to the cable winding unit 71. The drums in the cable winding unit 71 are driven by a worm shaft 75 which is connected by a universal joint 76 to a manually rotatable rod 77 by which the operator can raise and lower the header unit with respect to the supporting tubular members 15 and 16.

In order to free the vertical movement of the header from friction as much as possible so that it can readily shift upward to ride over an obstruction, I provide guide rollers 78 at the lower ends of the tubular members 15 and 16. These rollers bear against the rear face of the upright portions of the L-shaped members 17 and 18. The members 15 and 16 are slotted as indicated at 15a in Figure 8, to permit the rollers 78 to engage the upright portions of the L-shaped members 17 and 18. Intermediate the ends of the members 15 and 16, I provide front and rear rollers 79 and 80 on frames 81 that are fixed to the cross frame member 23 of the header proper. Wear plates 82 and 83 are provided on each of the members 15 and 16 to receive the rollers 79 and 80.

With the construction just described the entire header frame with its cutting and conveying mechanism and the dividers carried thereon is resiliently suspended for vertical movement on the upright members 15 and 16. By using springs 65 of the proper tension to substantially counterbalance the weight of the header frame, it is possible to have the header frame very lightly held so that its principal opposition to its movement up and down comes from the friction of the rollers 78, 79 and 80. The spring tension is not changed by raising and lowering the header through the use of the cables 67 and 72 and the winding unit 71 so that once a proper balance is obtained, no spring adjustment is needed.

In order to prevent the header frame from dropping to the ground in the event that a cable or spring breaks, each of the members 17 and 18 is provided with a safety mechanism connected to the tubular members 15 and 16.

Lugs 84 are provided on the members 17 and 18 to receive bolts 85 and 86 which extend up through lugs 87 and 88 that are mounted on the side plates that connect the members 12 and 13 to the tubular members 15 and 16. The bolts 85 and 86 and nuts 89 and 90 threaded thereon, are adapted to engage the lugs 87 and 88 to limit the downward movement of the header frame with respect to the supporting tubular members 15 and 16.

The cross piece 70 is braced by two braces 91 and 92. The tubular members 15 and 16 are also braced by rearwardly extending tie bars 93 and 94 which extend rearwardly and downwardly to the supporting members 12 and 13.

The drive mechanism by which power is supplied to operate the conveyor 31, 32 and 33, and to operate the sickle 35, is illustrated best in Figures 1 and 6 of the drawings. This same power mechanism also operates the cross elevating drapers 95 and 96 in the header spout 21. A power driven shaft 97 is brought forward from the power vehicle which operates the header and is connected by a universal joint 98 to a main drive shaft 99. The drive shaft 99 leads into a gear box 100 where it is operatively connected by a gear (not shown) to a shaft 101 that is connected through the header spout 21 to another gear box 102 to furnish power for operating the drapers 32 and 33 and the upper draper 96.

The shaft 99 also carries a pulley 103 which drives a belt 104 to furnish power to a pulley 105 and drive a crank arm 106 that operates the pitman rod 37. Another belt 107 is driven by the shaft 99 to drive a pulley 108 which is connected by a shaft 109 to an inner roller (not shown) for the draper conveyor 31. On the shaft 101, a pulley 110 drives a belt 111 which extends rearwardly and is connected to the upper roller (not shown) for driving the elevating draper 95 in the header spout 21.

The driving connection from the gear box 102 comprises a belt 112 driven from a pulley (not shown) on the front of the gear box 102. The belt 112 drives a pulley 113 on a shaft 114 of the inner roller (not shown) of the draper 32. A pulley 115, driven from the gear box 102, drives a belt 116 which extends downwardly around a pulley 117 to drive the shaft 118 of the rear roller of the draper 33. Another pulley 119, driven by the same shaft that drives the pulley 115, drives a belt 120 which passes around a pulley 121 on the shaft 122 of the lower roller 123 for the draper 96.

It is believed that the nature and advantages of my invention will be apparent from the foregoing description.

Having thus described my invention, I claim:

1. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, a tubular supporting member on the header frame above the cutter bar, the dividers being suspended from said member, the dividers having tubular portions for receiving air and the supporting member having outlets to said portions for supplying air to the tubular portions, the tubular portions having air discharge means near the lower ends of said dividers for discharging air rearwardly between the blades.

2. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, said dividers having tubular portions therein, means to conduct air under pressure to the tubular portions of said dividers, and the dividers having air discharge means thereon near their lower ends for discharging the air rearwardly between the dividers.

3. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, said dividers having tubular portions therein, means to conduct air under pressure to the tubular portions of said dividers, and the dividers having air discharge means thereon near their lower ends for discharging the air rearwardly between the dividers, and means on the frame for raising and lowering the dividers.

4. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, a tubular supporting member on the header frame above the cutter bar, the dividers being suspended from said member, the dividers having tubular portions for receiving air and the supporting member having outlets to said portions for supplying air to the tubular portions, said tubular portions decreasing in horizontal transverse dimension and increasing in horizontal fore and aft dimension from the supporting member downward, the tubular portions having air discharge means near the lower ends of said dividers for discharging air rearwardly between the dividers.

5. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, said dividers having means for causing a flow of air rearwardly between each pair of dividers for deflecting the crop therebetween rearwardly above the sickle and cutter bar, and means on the frame to raise and lower the dividers with respect to the sickle and cutter bar.

6. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, said dividers having means for causing a flow of air rearwardly between each pair of dividers for deflecting the crop therebetween rearwardly above the sickle and cutter bar, a propelling framework at the rear of the header frame, and guide means including rollers on the framework and on the header frame for guiding the header frame up and down on said framework.

7. In a header, a header frame, a cutter bar and a sickle thereon, conveying means on the frame behind the cutter bar to carry away the cut crop, means carried on the header frame above the cutter bar for deflecting the crop rearwardly over the cutter bar and sickle, a propelling framework carrying the header frame, suspension springs suspended on said framework and supporting the header frame, means on the framework for raising and lowering said springs, and guide means on the framework and on the header frame engaging each other to guide the header frame up and down on the framework.

8. In a header, a header frame, a cutter bar and a sickle thereon, conveying means on the frame behind the cutter bar to carry away the cut crop, means carried on the header frame above the cutter bar for deflecting the crop rearwardly over the cutter bar and sickle, a propelling framework carrying the header frame, suspension springs suspended on said framework and supporting the header frame, means on the framework for raising and lowering said springs, and guide means on the framework and on the header frame engaging each other to guide the header frame up and down on the framework, said guide means comprising upright telescoping tubular members on the header frame and on the framework, housing said suspension springs, and rollers on the framework at the lower ends of the tubular members thereon engaging the rear faces of the tubular members on the header frame.

9. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, and said dividers having means for causing a flow of air rearwardly between each pair of dividers for deflecting the crop therebetween rearwardly above the sickle and cutter bar.

10. A header comprising a frame, a cutter bar and a sickle thereon, conveying means on the frame behind the cutter bar to carry away the cut grain, a multiplicity of transversely spaced and fore and aft extending upright dividers supported on the frame, said dividers having their front edges positioned in front of the cutter bar and extending rearwardly over the sickle bar whereby to provide fore and aft extending air passages between the dividers over the cutter bar, and means on the header for causing a flow of air from the front edges of said dividers rearwardly between adjacent dividers for deflecting crops positioned between adjacent dividers rearwardly over the cutter bar.

11. A header comprising a frame, a cutter bar and a sickle thereon, conveying means on the frame behind the cutter bar to carry away the cut grain, a multiplicity of transversely spaced and fore and aft extending upright dividers supported on the frame, said dividers having their front edges positioned in front of the cutter bar and extending rearwardly over the sickle bar whereby to provide fore and aft extending air passages between the dividers over the cutter bar, said dividers having air passages provided with rearwardly directed outlets and means on the header forcing air under pressure through said passages thereby inducing a flow of air from the front edges of said dividers rearwardly between adjacent dividers for deflecting crops positioned between adjacent dividers rearwardly over the cutter bar.

12. A header comprising a frame, a cutter bar and a sickle thereon, conveying means on the frame behind the cutter bar to carry away the cut crop, a multiplicity of spaced substantially parallel upright blade-like crop dividers supported on the frame above the sickle, the forward edges of said dividers being in front of the sickle and the dividers extending rearwardly over the sickle and cutter bar, said dividers having sharp forward edges for passing through standing crops and increasing in horizontal transverse dimension from the forward edges rearwardly, said dividers having tubular portions for receiving air, said tubular portions having outlets therein spaced rearwardly of the front edges for discharging air rearwardly of the dividers whereby to cause a draft of air to travel rearwardly between adjacent dividers, and means connected to the dividers for supplying air under pressure to the tubular portions.

References Cited in the file of this patent
UNITED STATES PATENTS

| 689,800 | Hafermehl | Dec. 24, 1901 |
| 859,602 | Green | July 9, 1907 |
| 1,122,375 | Engle | Dec. 29, 1914 |
| 1,794,658 | Walsh | Mar. 3, 1931 |
| 1,900,269 | Altgelt et al. | Mar. 7, 1933 |
| 2,670,586 | Phillips | Mar. 2, 1954 |
| 2,710,516 | Kaesemeyer et al. | June 14, 1955 |